United States Patent
Brewen et al.

(10) Patent No.: US 6,693,872 B1
(45) Date of Patent: Feb. 17, 2004

(54) MULTI-TRACK OPTICAL DATA RECORDING AND READOUT

(75) Inventors: Alan T. Brewen, Pittsford, NY (US); Alan B. Marchant, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 704 days.

(21) Appl. No.: 09/650,199

(22) Filed: Aug. 29, 2000

(51) Int. Cl.[7] .................................................. G11B 7/00
(52) U.S. Cl. ............................ 369/124.02; 369/124.12; 369/47.18; 369/44.26
(58) Field of Search ........................... 369/44.35, 44.26, 369/44.37, 44.38, 44.41, 44.32, 44.34, 59.22, 47.15, 47.16, 47.17, 47.18, 47.19, 95, 96, 97, 124.02, 124.03, 124.07, 124.11, 124.12, 124.1, 59.26, 59.27

(56) References Cited

U.S. PATENT DOCUMENTS

| | | | |
|---|---|---|---|
| 4,283,777 A | | 8/1981 | Curry et al. |
| 4,969,137 A | | 11/1990 | Sugiyama et al. |
| 5,398,225 A | * | 3/1995 | Sugaya et al. ............ 369/47.49 |
| 5,559,775 A | * | 9/1996 | Matsueda ................ 369/59.17 |
| 5,729,512 A | | 3/1998 | Alon et al. |
| 5,870,361 A | * | 2/1999 | Audoin .................... 369/44.41 |
| 5,959,953 A | * | 9/1999 | Alon ....................... 369/44.41 |
| 5,963,525 A | * | 10/1999 | Audoin et al. ........... 369/59.22 |
| 5,989,671 A | | 11/1999 | Nakayama et al. |
| 6,381,210 B1 | * | 4/2002 | Alon et al. ............ 369/124.02 |
| 6,501,724 B2 | * | 12/2002 | Lee et al. ............... 369/124.02 |
| 6,567,364 B1 | * | 5/2003 | Takahashi et al. ............ 369/95 |

* cited by examiner

Primary Examiner—Thang V. Tran
Assistant Examiner—Bach Vuong
(74) Attorney, Agent, or Firm—Raymond L. Owens

(57) ABSTRACT

A method for optical data recording and readout includes scanning a blank region of an optical recording medium while recording a data band including a plurality of adjacent data tracks; synchronizing the recording on all tracks to a common data clock; and simultaneously recording control tracks with the band of data tracks, each control track having a well-defined track center and a repetitive pattern of marks that is synchronized to the data clock. The method further includes optically sensing the cross-scan positions and clock offsets of at least one control track on either side of the data band; interpolating between the control track cross-scan positions to predict the cross-scan positions of each data track and compensate for magnification errors; interpolating between the control track clock offsets to predict the clock offset of each data track and compensate for skew errors; and simultaneously reading and decoding information recorded on all tracks of the data band.

11 Claims, 5 Drawing Sheets

(Prior Art)

(Prior Art)

MULTI-TRACK OPTICAL DATA RECORDING AND READOUT

FIELD OF THE INVENTION

The present invention relates to multi-track optical data recording and readout with magnification and skew compensation.

BACKGROUND OF THE INVENTION

All optical recording systems incorporate servo controls with sensors for tracking offset, data clock, and clock synchronization derived from recorded data marks and/or preformatted track patterns. However, implementation of such sensors involves tradeoffs between recording areas dedicated to the servo function versus restrictions on data encoding formats and degradation in sensor accuracy and servo performance.

For multichannel recording, it is recognized that a single preformatted track may be used for track and clock sensing for multiple data tracks (see U.S. Pat. No. 4,283,777).

It is also recognized that a global tracking error signal for a band of data tracks can be generated by simultaneously sensing the two edges of the data band, visible because of a guard space left between neighboring data (see U.S. Pat. No. 5,989,671).

Multichannel optical tape readout requires servo operations in addition to the usual tracking, focus, clock, and synchronization. The additional error sources are magnification and skew.

Magnification error causes data tracks to be mapped onto a data detector surface with a pitch that is smaller or larger than nominal. The problem of magnification error is set forth in U.S. Pat. No. 4,969,137 (Hitachi) which rotates an array of recording spots at the media surface so that the spot spacing projected in the media scanning direction matches the desired track pitch. U.S. Pat. No. 5,729,512 discloses a multichannel optical disk readout system with sensors to measure tracking offset and estimate the magnification error for subsequent compensation.

Skew error is an offset in clock synchronization from one data track to the next. Skew error is caused by a relative rotation of the data band mapped onto the detector surface.

Problems associated with magnification and skew errors are most severe during data readout. Deviation from nominal magnification and skew during recording will not interfere with the recording process unless the errors are so great as to cause tracks to overlap. But during readout, errors much less than 1 $\mu$m in the in-track or cross-track directions could severely degrade signal quality. Furthermore, the net error during readout is a combination of deviations in the recording system, readout system (possibly a different system), and the media.

Prior art teaches that misalignments (including tracking, focusing, and magnification errors) can be detected by sensors that examine recorded data tracks or utilize light reflected from the data regions of the recording medium. However, effective operation of such sensors imposes restrictions on the recorded data patterns such as track pitch and modulation code and on the media characteristics such as reflective phase shift. For optimal data recording, it is thus desirable to decouple alignment error sensing from the data-bearing tracks.

According to the present invention, co-written control tracks are written on either side of the data band at the time of recording. During readout, independent tracking position error signals and data clock signals are extracted from each control track. The track position of each track in the data band is inferred as a linear interpolation between the two control track positions. The clock offset for decoding each track is inferred as a linear interpolation between the clock offsets measured for the two control tracks.

SUMMARY OF THE INVENTION

It is therefore an object of the present invention to effectively control magnification and skew error during data readout and respond to the current state of the recorded data pattern.

This object is achieved by a method for optical data recording and readout, comprising:

a) scanning a blank region of an optical recording medium while recording a data band including a plurality of adjacent data tracks;

b) synchronizing the recording on all tracks to a common data clock;

c) simultaneously recording control tracks with the band of data tracks, each control track having a well-defined track center and a repetitive pattern of marks that is synchronized to the data clock;

d) optically sensing the cross-scan positions and clock offsets of at least one control track on either side of the data band;

e) interpolating between the control track cross-scan positions to predict the cross-scan positions of each data track and compensate for magnification errors;

f) interpolating between the control track clock offsets to predict the clock offset of each data track and compensate for skew errors; and g) simultaneously reading and decoding information recorded on all tracks of the data band.

DETAILED DESCRIPTION OF THE INVENTION

Figure 1:
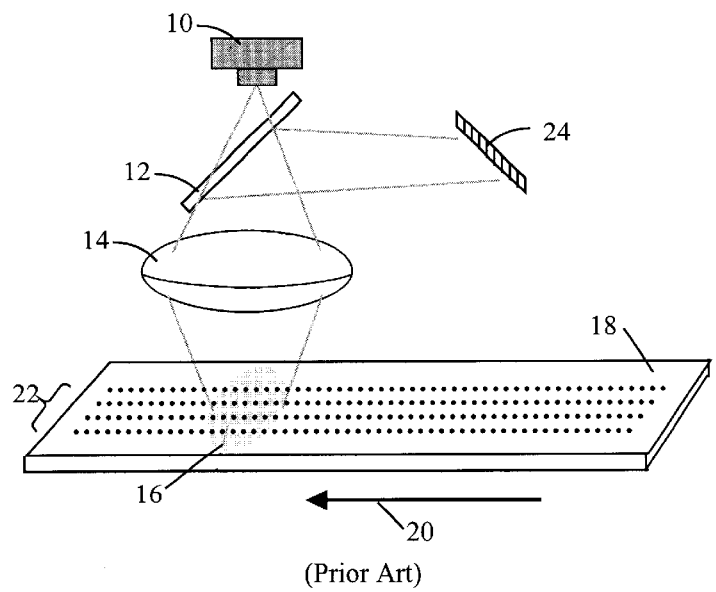
FIG. 1 is a prior art schematic diagram of a system for multichannel readout.

A system configuration for multichannel readout of information from an optical recording medium is illustrated in FIG. 1. Light from readout illumination source 10 passes through an optical assembly having a beam splitter 12 and an objective lens 14 and is focused by the objective lens 14, forming a readout spot 16 on the surface of an optical recording medium 18. The optical assembly focuses the laser assay to form a pattern of focused spots at a media plane. As the recording medium moves in an image scan velocity 20 relative to the readout spot, a data band 22 consisting of a plurality of recorded data tracks 24a–24d passes under the readout spot. The light reflected by the data tracks is reflected back through the objective lens 14 and focused onto elements of a readout detector array 26.

This discussion and the related figures explicitly describe a data band containing four data tracks. However, it should be appreciated that the data band may contain very many data tracks. The problems, solutions, and system implementations described for four data tracks are equally applicable when the data band holds two, three, or any number of data tracks.

Figure 2:
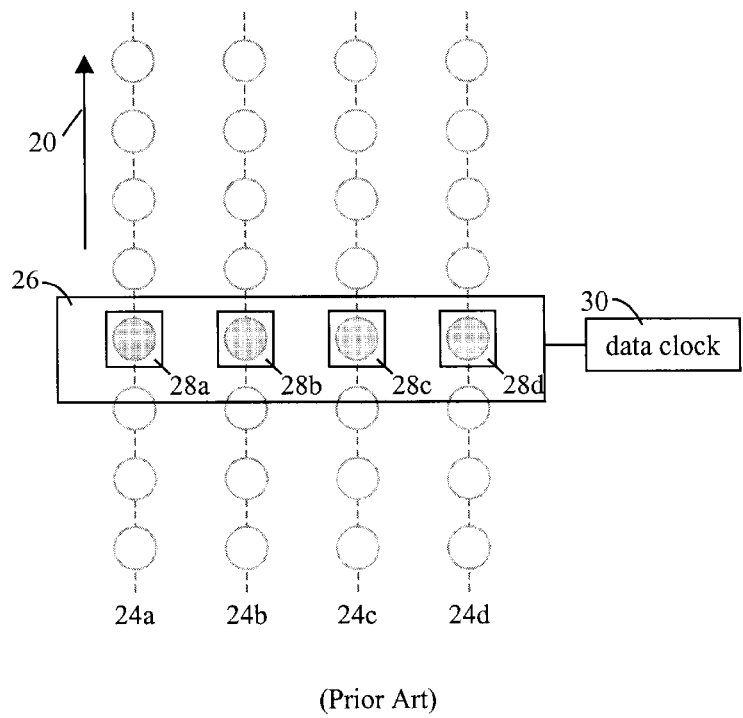
FIG. 2 schematically illustrates prior art conditions for simultaneous readout of data from multiple tracks in a data band.

FIG. 2 illustrates nominal conditions for simultaneous readout of data from multiple tracks in a data band. Data tracks 24a–24d are imaged onto the detector array 26. Each data track is imaged onto a corresponding detector element; that is, light reflected from track 24a is reflected onto detector element 28a, light reflected from track 24b is reflected onto detector element 28b, and similarly for tracks 24c and 24d and detector elements 28c and 28d. As scanning of the medium causes the image to scan across the detector in a image scan direction 20', successive marks on each data track are imaged onto the detector elements. At intervals determined by a data clock 30 the signal from each detector element is checked to see whether a mark is present on the corresponding data track.

Figure 3:
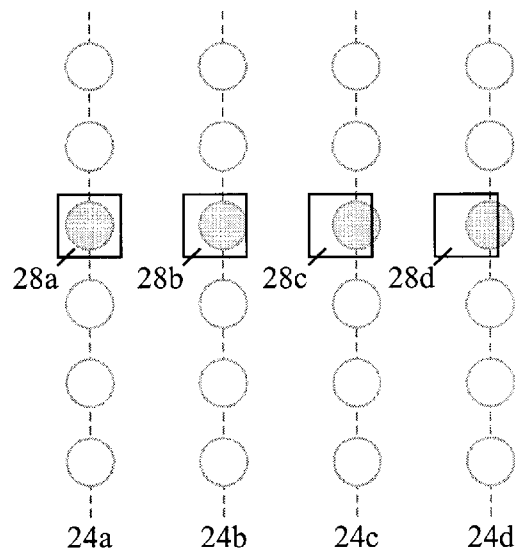
FIG. 3 illustrates how magnification error affects multichannel data readout in the prior art.

FIG. 3 illustrates how a positive magnification error affects multichannel data readout. Data track 24a is well centered on detector element 28a. However, because the pitch between tracks as imaged at the detector plane is slightly larger than the spacing between detectors, data track 24b is offset slightly from the center of detector element 28b. Tracks 24c and 24d are decentered even more. The decenter reduces the amplitude of the response of detector elements 28c and 28d to marks that may be present on tracks 24c and 24d. If the magnification error is large enough, the images of some tracks may miss the corresponding detector elements entirely or a detector element may receive interfering illumination from a non-corresponding data track. Negative magnification error occurs when the imaged track pitch is smaller than the detector pitch. Negative and positive magnification error interfere with data readout in a similar fashion.

Figure 4:
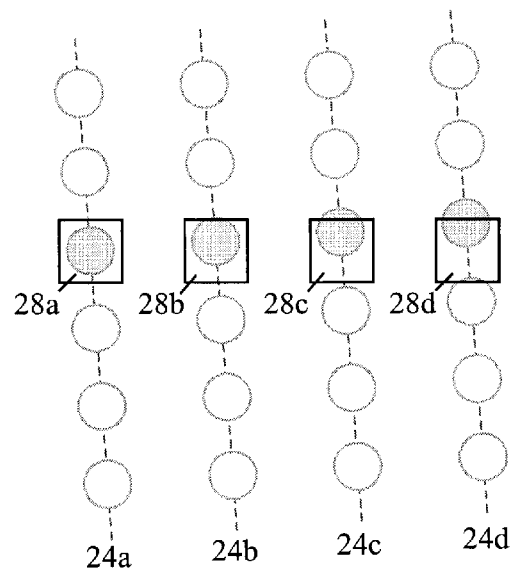
FIG. 4 illustrates how skew error affects multichannel data readout; in the prior art.

FIG. 4 illustrates how skew error affects multichannel data readout. The image of the track pattern is slightly rotated with respect to the detector array. When a data mark on data track 24a is centered on detector element 28a in the in-track direction, a mark located at the same in-track position on data track 24b is slightly displaced in the in-track direction relative to detector element 28b. Marks on tracks 24c and 24d are offset even more. This skew error introduces clocking offsets into the recorded responses of detector elements 28c and 28d to mark patterns recorded on tracks 24c and 24d.

Figure 5:
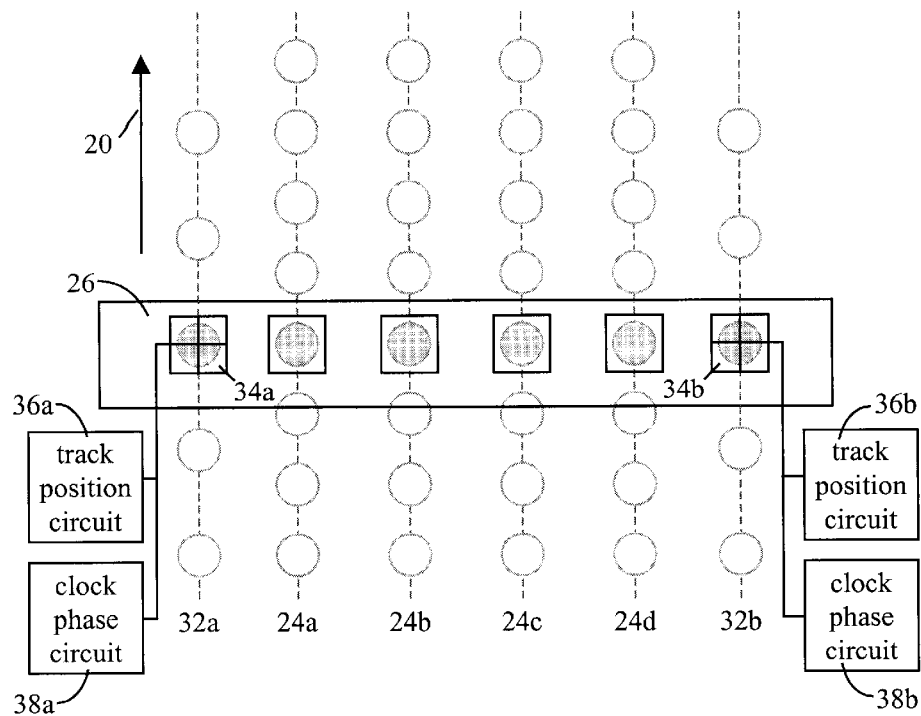
FIG. 5 schematically illustrates in accordance with the present invention the use of co-written control tracks for multichannel readout of data in an optical recording system.

The use of co-written control tracks for multichannel readout of data in an optical recording system according to the present invention is illustrated in FIG. 5. The data band includes a plurality of data tracks 24a–24d bounded on each side by control tracks 32a and 32b that are recorded at the same time as the data tracks. Each control track has a well defined track center, measurable by optical sensor means with a precision much finer than the track pitch. Each control track includes a repetitive pattern of marks recorded in the optical recording medium from which a clock frequency and clock timing offset may be derived by optical sensor means. Thus, the present invention simultaneously records control tracks with the band of data tracks, each control track having a well-defined track center and a repetitive pattern of marks that is synchronized to the data clock. The in-track positions of the control track marks are synchronized to the marks on the data tracks. During data readout, the control tracks are imaged onto control track sensors 34a and 34b on the readout detector array 26. As the data band is scanned in direction 20, the signals from the control track sensor 34a, are processed respectively by track position circuit 36a and clock offset circuit 38a to generate the cross-track position and clock offset for control track 32a. Similarly, track position circuit 36b and clock offset circuit 38b independently identify the cross-track position and clock offset for control track 32b. It will be appreciated that the control tracks can be disposed within the band of data tracks.

Figure 6:
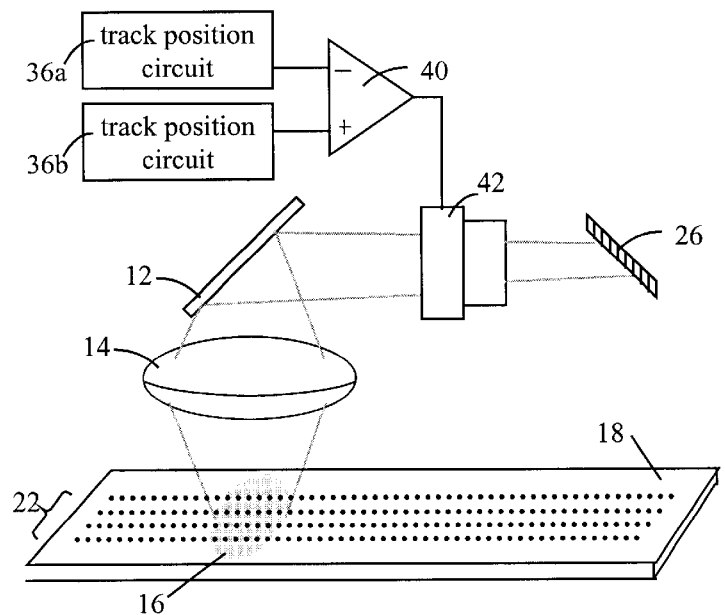
FIG. 6 shows one method by which magnification error may be compensated in accordance with the present invention.

FIG. 6 shows one method by which magnification error may be compensated. In the multichannel readout system, a data band 22 on the optical recording medium 18 is illuminated by a readout spot 16. Light reflected from the data band is collected by the objective lens 14 and relayed by a beam splitter 12 and a zoom optics assembly 42 to form an image of the data band on the readout detector array 26. Cross-track position signals for the two control tracks at the edges of the data band are processed by a difference circuit 40, creating a net magnification error signal that is fed to the zoom optics assembly. The zoom optics assembly responds by adjusting the magnification of the image on the detector array to maintain a nominal magnification.

Figure 7:
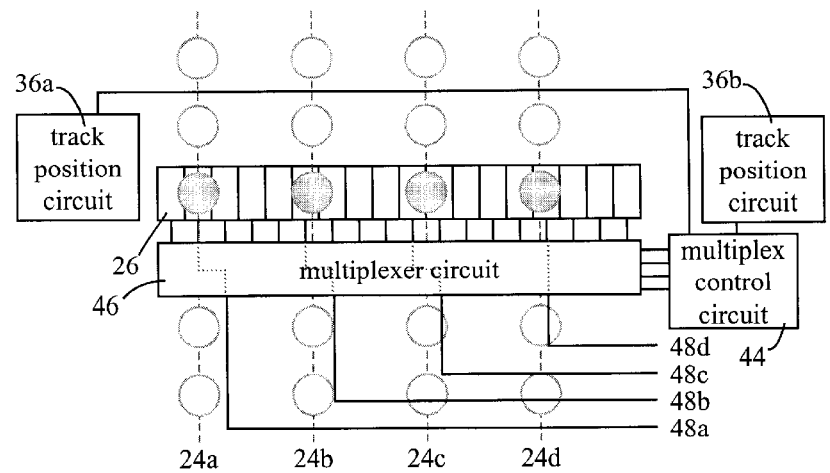
FIG. 7 shows another method by which magnification error may be compensated in accordance with the present invention.

FIG. 7 illustrates an alternative method of compensating for magnification error. Data tracks 24a–24d are imaged onto a readout detector array 26 that includes two or more detector elements for each data track. Cross-track position signals from the track position circuits 36a and 36b corresponding to the two control tracks at the edges of the data band are processed by a multiplex control circuit 44 that identifies which element of the readout detector array is most closely centered to the image of each data track. The multiplex control circuit may include for example a lookup table or digital logic. The multiplex control circuit drives a multiplexer circuit 46 which connects the detector element corresponding to data tracks 24a–24d to data channels 48a–48d, respectively.

Figure 8:
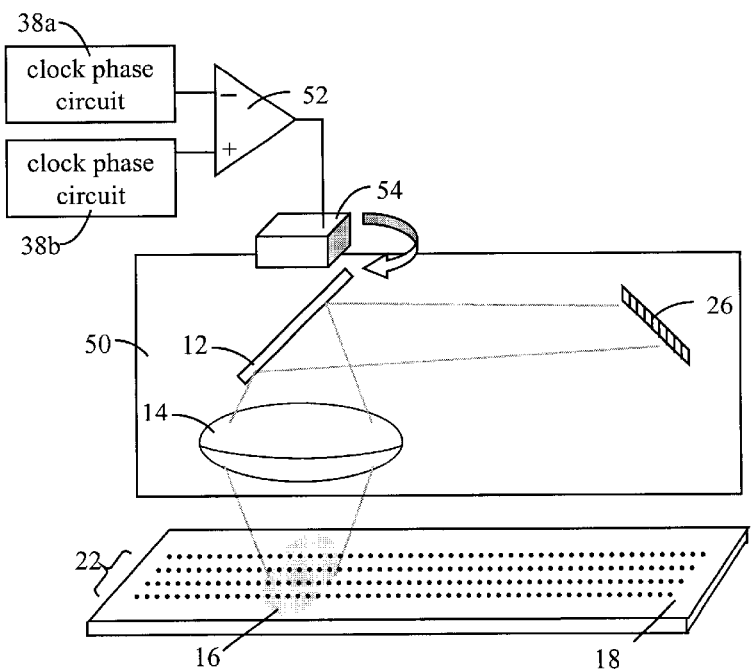
FIG. 8 shows one method by which skew error may be compensated in accordance with the present invention.

FIG. 8 shows one method by which skew error may be compensated. In the multichannel readout system, a data band 22 on the optical recording medium 18 is illuminated by a readout spot 16. Light reflected from the data band is collected by the objective lens 14 and relayed by a beam splitter 12 to form an image of the data band on the readout detector array 26. The objective lens, beam splitter and detector array are maintained in relative alignment by a head structure 50. The signals from clock offset circuits 38a and 38b responsive to the two control tracks at the edges of the data band are processed by a difference circuit 52, creating skew error signal that is fed to a head rotation actuator 54. The head rotation actuator responds by rotating the head structure around the optical axis of the objective lens to eliminate the skew error.

Figure 9:
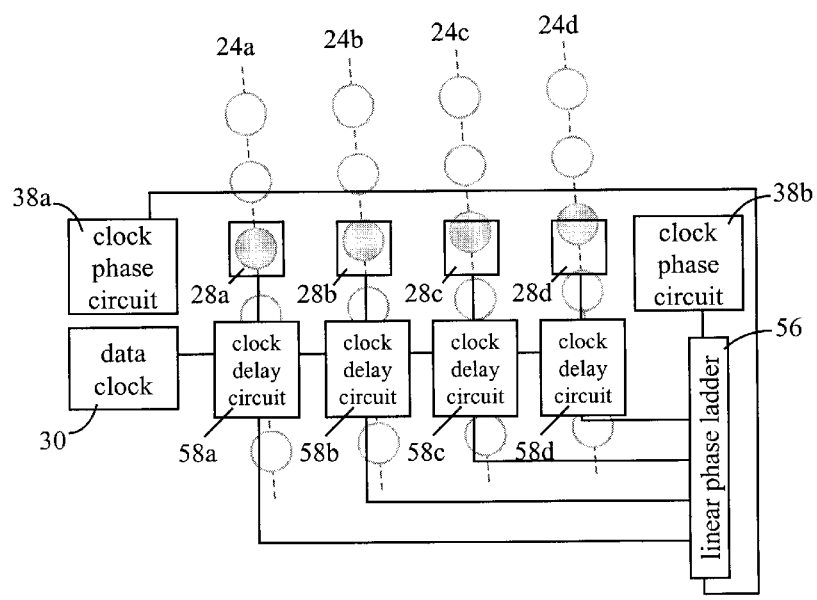
FIG. 9 shows another method by which skew error may be compensated in accordance with the present invention.

FIG. 9 illustrates an alternative method of compensating for skew error. Data tracks 24a–24d are imaged onto readout detector elements 28a–28d. Clock offset signals from the clock offset circuits 38a and 38b corresponding to the two control tracks at the edges of the data band are input to the ends of a linear signal ladder 56 that creates a set of timing offset signals, one for each data track interpolated between the control track clock offset signals. The individual offset signals are directed to delay generation circuits 58a–58d which delay a data clock signal from data clock 30, creating an optimally phased clock signal for sampling of each of the detector elements 28a–28d. The term "interpolate" will be understood to encompass linear extrapolation for data tracks that are exterior to the control tracks.

Figure 10:
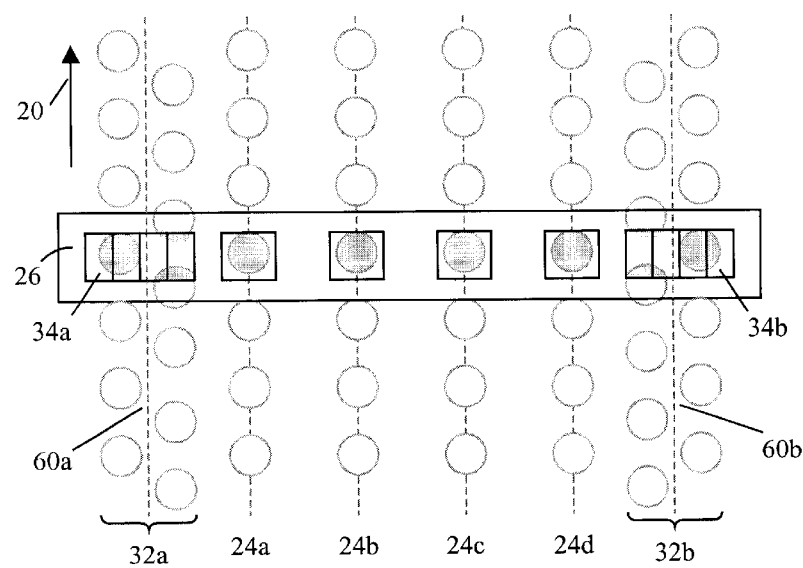
FIG. 10 illustrates the use of control tracks with a cross-track dither pattern in accordance with the present invention.

FIG. 10 illustrates the use of control tracks with a cross-track dither pattern. Data tracks 24a–24d and control tracks 32a and 32b are imaged onto a readout detector array 26. Each control track consists of marks that are alternately displaced to either side of the control track center lines 60a and 60b, respectively. The regular cross-track displacement or dither of the control track marks permits accurate track position sensing by the control track sensors 34a and 34b. The control track center may be identified, for example, as the place on the control track sensor where the signal amplitude at the control track dither frequency is minimized.

The invention has been described in detail with particular reference to certain preferred embodiments thereof, but it will be understood that variations and modifications can be effected within the spirit and scope of the invention.

PARTS LIST 10 readout illumination source
12 beam splitter
14 objective lens
16 readout spot
18 optical recording medium
20 media scan velocity
20' image scan direction
22 data band
24a data track
24b data track
24c data track
24d data track
26 readout detector array
28a detector element
28b detector element
28c detector element
28d detector element
30 data clock
32a control track
32b control track
34a control track sensor
34b control track sensor
36a track position circuit
36b track position circuit
38a clock offset circuit
38b clock offset circuit
40 difference circuit
42 zoom optics assembly
44 multiplex control circuit
46 multiplexer circuit
48a readout data channel
48b readout data channel
48c readout data channel
48d readout data channel
50 head structure
52 difference circuit
54 head rotation actuator
56 linear signal ladder
58a clock delay circuit
58b clock delay circuit
58c clock delay circuit
58d clock delay circuit
60a control track centerline
60b control track centerline

What is claimed is:

1. A method for optical data recording and readout, comprising:
   a) scanning a blank region of an optical recording medium while recording a data band including a plurality of adjacent data tracks;
   b) synchronizing the recording on all tracks to a common data clock;
   c) simultaneously recording control tracks with the band of data tracks, each control track having a well-defined track center and a repetitive pattern of marks that is synchronized to the data clock;
   d) optically sensing the cross-scan positions and clock offsets of at least one control track on either side of the data band;
   e) interpolating between the control track cross-scan positions to predict the cross-scan positions of each data track and compensate for magnification errors;
   f) interpolating between the control track clock offsets to predict the clock offset of each data track and compensate for skew errors; and
   g) simultaneously reading and decoding information recorded on all tracks of the data band.

2. The method of claim 1 in which at least one control track includes marks with a regular dither in the cross-scan direction.

3. The method of claim 1 wherein control tracks are recorded on each side of and adjacent to the bank of data tracks.

4. A system for multichannel optical recording, comprising:
   a) scanning means for providing uniform relative motion of an optical recording medium relative to an optical head, with the media surface being positioned at the focal plane of the optical head;
   b) an array of laser elements, including a plurality of data-track recording elements arranged in a pattern having regular spacing as projected onto a line perpendicular to the media scan direction, said array including at least one control track recording element disposed at each end of the line;
   c) means for focusing the elements of the laser array onto the focal plane of the optical head;
   d) electronic means for modulating each data-track recording element in response to an input from an assigned data channel, thereby recording a band of data tracks, and to modulate each control track recording element in accordance with a control track pattern, thereby recording two control tracks; and
   e) a recording clock coupled to the laser elements for controlling the modulation of the laser elements.

5. The system of claim 4 wherein the array of recording sources is a VCSEL array.

6. The system of claim 4 wherein two control track laser elements record a single control track with a regular dither in the cross-track direction.

7. A system for multichannel optical readout, comprising:
   a) means for detecting a reflectivity pattern across a band of data tracks on an optical data carrier to generate a data readout signal for each of a plurality of data track in a data band;

b) first sensor means for measuring the cross-scan positions of control tracks disposed on either side of the data band;
c) means responsive to the first sensor means for compensating the readout signals for magnification errors in the position of tracks imaged on the detector to provide compensated data signals from each data track;
d) second sensor means for detecting the clock offset from both control tracks; and
e) means responsive to the second sensor means for compensating the readout signals for skew in the data decoding of each data track, whereby the skew and magnification errors are compensated.

8. The system of claim 7 wherein the step of compensating for magnification errors includes mechanically adjusting spacing of optical elements.

9. The system of claim 7 wherein the detecting means provides oversampling of the reflectivity pattern in a cross track direction.

10. The system of claim 7 wherein the skew compensation means includes applying a relative rotation between the readout system and the data carrier.

11. The system of claim 7 wherein the skew compensation includes applying a timing delay to the clock used to decode data from each data track.

* * * * *